US012552126B2

(12) United States Patent
Lu

(10) Patent No.: US 12,552,126 B2
(45) Date of Patent: Feb. 17, 2026

(54) TELESCOPIC FLANGING INNER EXPANSION ASSEMBLY AND FLANGING DEVICE

(71) Applicant: Shurcon Manufacturing (Zhejiang) CO, LTD, Jiaxing (CN)

(72) Inventor: Lianghui Lu, Jiaxing (CN)

(73) Assignee: SHURCON MANUFACTURING (ZHEJIANG) CO, LTD, Jiaxing (CN)

( * ) Notice: Subject to any disclaimer, the term of this patent is extended or adjusted under 35 U.S.C. 154(b) by 0 days.

(21) Appl. No.: 18/991,771

(22) Filed: Dec. 23, 2024

(65) Prior Publication Data

US 2025/0121577 A1 Apr. 17, 2025

Related U.S. Application Data

(63) Continuation of application No. PCT/CN2022/101352, filed on Jun. 27, 2022.

(30) Foreign Application Priority Data

Jun. 23, 2022 (CN) ......................... 202210719192.6

(51) Int. Cl.
*B31F 1/00* (2006.01)

(52) U.S. Cl.
CPC .................................. *B31F 1/0038* (2013.01)

(58) Field of Classification Search
CPC ..................................................... B31F 1/0038
See application file for complete search history.

(56) References Cited

U.S. PATENT DOCUMENTS

| | | | | |
|---|---|---|---|---|
| 2,541,905 | A * | 2/1951 | Amberg | B31F 1/0087 493/158 |
| 3,668,981 | A * | 6/1972 | Turpin | B31F 1/0038 493/158 |
| 7,677,435 | B2 * | 3/2010 | Stahlecker | B65D 81/3869 206/515 |
| 2002/0111260 | A1 * | 8/2002 | Sand | B31F 1/0038 493/51 |
| 2006/0226210 | A1 * | 10/2006 | Stahlecker | B31F 1/0038 206/519 |
| 2018/0111346 | A1 * | 4/2018 | Sand | B31B 50/28 |
| 2023/0191739 | A1 * | 6/2023 | Andersen | B31F 1/0087 493/158 |

* cited by examiner

*Primary Examiner* — Thomas M Wittenschlaeger
(74) *Attorney, Agent, or Firm* — WPAT, PC

(57) ABSTRACT

A telescopic flanging inner expansion assembly, a flanging device and a flanging method for pulp molded cup lids solve defects such as unreasonable design in related art. The telescopic flanging inner expansion assembly includes a fixed air supply seat, a rotating shaft, a flanging positioning seat, movable inner expansion blocks, and a pneumatic driving mechanism. The rotating shaft is in an upright state, the rotating shaft penetrates the fixed air supply seat and is rotatable relative to the fixed air supply seat. The flanging positioning seat is fixedly mounted on a top of the rotating shaft. This allows the flanged pulp molded cup lid to be quickly removed without causing radial expansion of the inner diameter of the inner convex part during the removal process, ultimately ensuring a sealing performance of the pulp molded cup lid when placed on a cup and further enhancing the anti-detach performance.

12 Claims, 11 Drawing Sheets

TELESCOPIC FLANGING INNER EXPANSION ASSEMBLY AND FLANGING DEVICE

CROSS-REFERENCE TO RELATED APPLICATION

This application claims priority to Chinese patent application No. CN202210719192.6, filed to China National Intellectual Property Administration (CNIPA) on Jun. 23, 2022, which is herein incorporated by reference in its entirety.

TECHNICAL FIELD

The disclosure relates to the technical field of pulp molding cup lid processing, and particularly to a telescopic flanging inner expansion assembly, a flanging device and a flanging method for pulp molded cup lids.

BACKGROUND

Pulp molded cup lids are used to cover cups and play a sealing role.

In existing processes of manufacturing pulp molded cup lids, some people have designed an inner convex buckle on an inner wall of a side flap of the cup lid, and the formation of the inner convex buckle is either integrated into a molding process of the pulp molded cup lid or realized through a subsequent rolling forming process.

For example, a Chinese patent with the application No. CN201922057581.3 has disclosed a servo forming device for processing annular buckles of pulp cup lids in a controllable feeding manner. The servo forming device includes a workbench. The workbench is provided with one or more main wheel assemblies, one or more down-pressing assemblies matched with the main wheel assemblies, and one or more auxiliary wheel assemblies. The down-pressing assemblies are disposed above the main wheel assemblies through supporting cantilevers installed on the workbench. Each the main wheel assembly includes a servo motor, a rotating main shaft, and a pressing buckle main wheel. Each the down-pressing assembly includes a pressing drive mechanism and a pressing block, and the pressing block is connected to and driven by the pressing drive mechanism. Each the auxiliary wheel assembly includes a translation drive mechanism and a pressing buckle auxiliary wheel driven by the translation drive mechanism to approach and press a sidewall of a cup lid blank to thereby form an annular buckle. The translation drive mechanism is provided with a torque sensor capable of detecting a torque of the pressing buckle auxiliary wheel pressing the sidewall of the cup lid blank. A servo proportional valve is connected to a controller, and the controller is connected to the torque sensor and is configured (i.e., structured and arranged) to control an operation of the servo proportional valve based on detected data of the torque sensor.

The above-mentioned method is a rolling and pressing solution carried out after molding the pulp molded cup lid. Disadvantages of the above-mentioned method is as follows.

Since the side flap of the cup lid is formed with the inner convex buckle after flanging, during a process of unloading the cup lid by a mechanical arm, an inner diameter of the inner convex buckle when being upwardly taken out will expand radially, which will lead to increased difficulty in material loading of the mechanical arm. Meanwhile, the inner convex buckle of the cup lid is expanded radially, which would lead to reduced sealing performance in subsequent use, and thus the design is unreasonable in some extents.

SUMMARY

Aiming to the above problems, purposes of the disclosure are to provide a telescopic flanging inner expansion assembly, a flanging device and a flanging method for pulp molded cup lids, so as to solve the above-mentioned technical problems.

To achieve above purpose, the technical solutions of the disclosure are as follows.

A telescopic flanging inner expansion assembly for pulp molded cup lids includes a fixed air supply seat, a rotating shaft, a flanging positioning seat, movable inner expansion blocks, and a pneumatic driving mechanism. The rotating shaft is configured to be in an upright state, the rotating shaft penetrates through the fixed air supply seat and is rotatable relative to the fixed air supply seat. The flanging positioning seat is mounted at a top of the rotating shaft. The movable inner expansion blocks are circumferentially and evenly distributed around an axis line of the flanging positioning seat, and the movable inner expansion blocks are configured to translate in a plane perpendicular to the axis line of the flanging positioning seat. The pneumatic driving mechanism includes at least one first air passage formed in the fixed air supply seat, and at least one second air passage formed in the flanging positioning seat, each of the at least one first air passage is communication with one of the at least one second air passage, and configured to supply air to drive the movable inner expansion blocks to translate in the plane perpendicular to the axis line of the flanging positioning seat.

In an embodiment, a number of the movable inner expansion blocks is four, a number of the at least one first air passage is two, and a number of the at least one second air passage is two. each of the two second air passage is configured to supply air to drive two of the four movable inner expansion blocks to translate in the plane perpendicular to the axis line of the flanging positioning seat.

In an embodiment, a centering sleeve is disposed on a top of the fixed air supply seat, and the centering sleeve rotatably abuts against the fixed air supply seat. The centering sleeve is formed with at least one third air passage connected to the at least one first air passage, and at least one third air nozzle connected to the at least one third air passage is disposed on an outer circumferential surface of the centering sleeve, at least one second air nozzle connected to the at least one second air passage is disposed on an outer circumferential surface of the flanging positioning seat, and each of the at least one third air nozzle and one of the at least one second air nozzle are connected through a ventilation duct.

In an embodiment, a flange is mounted on the top of the rotating shaft, the flanging positioning seat is fixedly mounted on an upper surface of the flange, and the centering sleeve is fixedly mounted on a lower surface of the flange.

In an embodiment, cylindrical locating pins are disposed on the flange and penetrating through the flange. The centering sleeve defines radial slots in a cross-section thereof, inner walls of the respective radial slots are arc-shaped slot surfaces, the cylindrical locating pins are inserted into the radial slots, respectively. And a part of a cylindrical surface of each of the cylindrical locating pins fits with a corresponding one of the arc-shaped slot surfaces.

In an embodiment, the flanging positioning seat defines radial sliding slots on a top thereof, and a sliding block is disposed on a lower surface of each of the movable inner expansion blocks. The sliding block is movably mounted in a corresponding one of the radial sliding slots, a sealed air chamber is defined between a lower surface of each of the sliding blocks and a bottom of the corresponding one of the radial sliding slots, and each of the at least one second air passage is at least connected to one the sealed air chamber.

In an embodiment, a flanging device with multi stations for pulp molded cup lids is also provided, the flanging device includes a fixed frame, and the multiple telescopic flanging inner expansion assemblies mentioned above are rotatably disposed on the fixed frame.

In an embodiment, the flanging device further includes elastic down-pressing components disposed above the multiple telescopic flanging inner expansion assemblies, respectively; and flanging components disposed on lateral sides of the telescopic flanging inner expansion assemblies, respectively.

In an embodiment, a number of the telescopic flanging inner expansion assemblies is eight, and the eight telescopic flanging inner expansion assemblies are configured to rotate synchronously in a same direction. A number of the elastic down-pressing components is eight, the eight elastic down-pressing components are disposed on a lifting frame, and the lifting frame is connected to a lifting driver.

In an embodiment, the eight telescopic flanging inner expansion assemblies are arranged in three rows, a number of the telescopic flanging inner expansion assemblies in a central row of the three rows is less than a number of the telescopic flanging inner expansion assemblies in each of rest two rows of the three rows, and the numbers of the telescopic flanging inner expansion assemblies in the respective rest two rows are equal. A number of the flanging components is eight, the eight flanging components are arranged in three rows, two of the eight flanging components in a central row of the three rows and the telescopic flanging inner expansion assemblies in the central row are arranged on a straight line, and the flanging components in each of rest two rows of the three rows are positioned on outer sides of the respective telescopic flanging inner expansion assemblies in a corresponding one of the rest two rows.

In an embodiment, the two flanging components in the central row are movable towards each other or away from each other, the flanging components of one of the rest two rows and the flanging components of the other one of the rest two rows are movable towards each other or away from each other.

In an embodiment, each of the flanging components includes a translation seat and a flanging wheel mounted on the translation seat.

A flanging method for pulp molded cup lids using the flanging device with the multi stations is further provided. The flanging method includes steps as follows.

- S1, Place lid: a mouth of a pulp molded cup lid to be flanged is placed downward to cover movable inner expansion blocks converged together.
- S2, Tightening through expanding: the movable inner expansion blocks translate radially outward from an axis line of the flanging positioning seat, causing an outer circumferential surface of the movable inner expansion blocks to press against an inner wall of the pulp molded cup lid. During a process where the movable inner expansion blocks press against the inner wall of the pulp molded cup lid, the elastic down-pressing components descend to press on a top surface of the pulp molded cup lid.
- S3, Flange: flanging components, driven by a translational force, approach the pulp molded cup lids, respectively. A rotation direction of the pulp molded cup lid is opposite to the rotation direction of the flanging components, that is, an inner convex part is formed on the inner wall of the pulp molded cup lid by flanging.
- S4, Lid removal, the movable inner expansion blocks translate radially inward from the axis line of the flanging positioning seat, thereby defining a gap between an inner wall of the inner convex part and the outer circumferential surface of the movable inner expansion blocks, and then the pulp molded cup lid is removed.

Compared to the related art, the beneficial effects of the disclosure are as follows.

A telescopic internal expansion structure is used, when the movable inner expansion blocks converge, the pulp molded cup lid is directly placed to cover the converged movable inner expansion blocks. Then, the converged movable inner expansion blocks radially expand outward and internally expand against the inner wall of the pulp molded cup lid. After the flanging process is completed, the movable inner expansion blocks converge radially inward. At this point, the outer circumferential surface of the movable inner expansion blocks and the inner wall of the processed pulp molded cup lid form a gap that is greater than or equal to an inner diameter of the inner convex part. This allows the flanged pulp molded cup lid to be quickly removed without causing radial expansion of the inner diameter of the inner convex part during the removal process, ultimately ensuring a sealing performance of the pulp molded cup lid when placed on a cup and further enhancing the anti-detach performance.

DESCRIPTION OF REFERENCE NUMERALS

A. telescopic flanging inner expansion assembly; 1. fixed air supply seat; 10. flat-bottomed recessed area 11. first air nozzle; 2. rotating shaft; 20. flange; 200. through slot; 201. upper convex part; 21. cylindrical locating pin; 3. flanging positioning seat; 30. second air nozzle; 31. radial sliding slot; 32. sliding block; 33. sealed air chamber; 4. movable inner expansion block; 40. ventilation duct; Q1. first air passage; Q2. second air passage; Q3. third air passage; 5. centering sleeve; 50. third air nozzle; 51. radial slot; 52. arc-shaped slot surface; 6. fixed frame; 7. servo motor; 8. main body; 80. cantilever rack; B. elastic down-pressing component; B0. lifting frame; B01. lifting driver; B1. pressing block; B2. front axle lower swing arm; B3. detach prevention cap; B4. spring; C. flanging component; C1. lifting frame; C2. lifting driver; C3. flanging wheel; C4. translation seat.

DETAILED DESCRIPTION OF EMBODIMENTS

The following are specific embodiments of the disclosure, combined with the attached drawings, to further describe the technical solution of the disclosure, but the disclosure is not limited to these embodiments.

Embodiment 1

Figure 1:
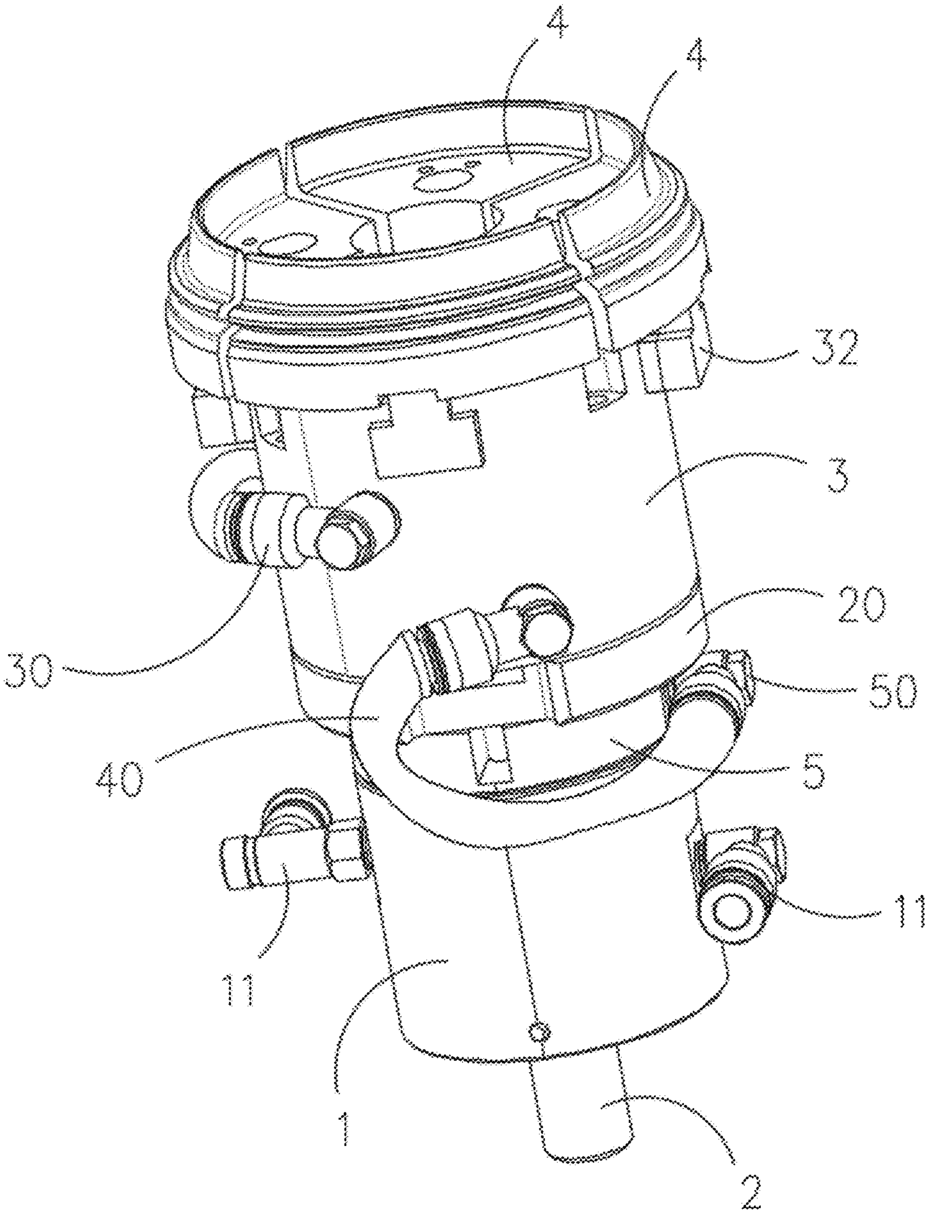
FIG. 1 illustrates a three-dimensional schematic structure diagram of a telescopic flanging inner expansion assembly for pulp molded cup lids in the disclosure.
Figure 2:
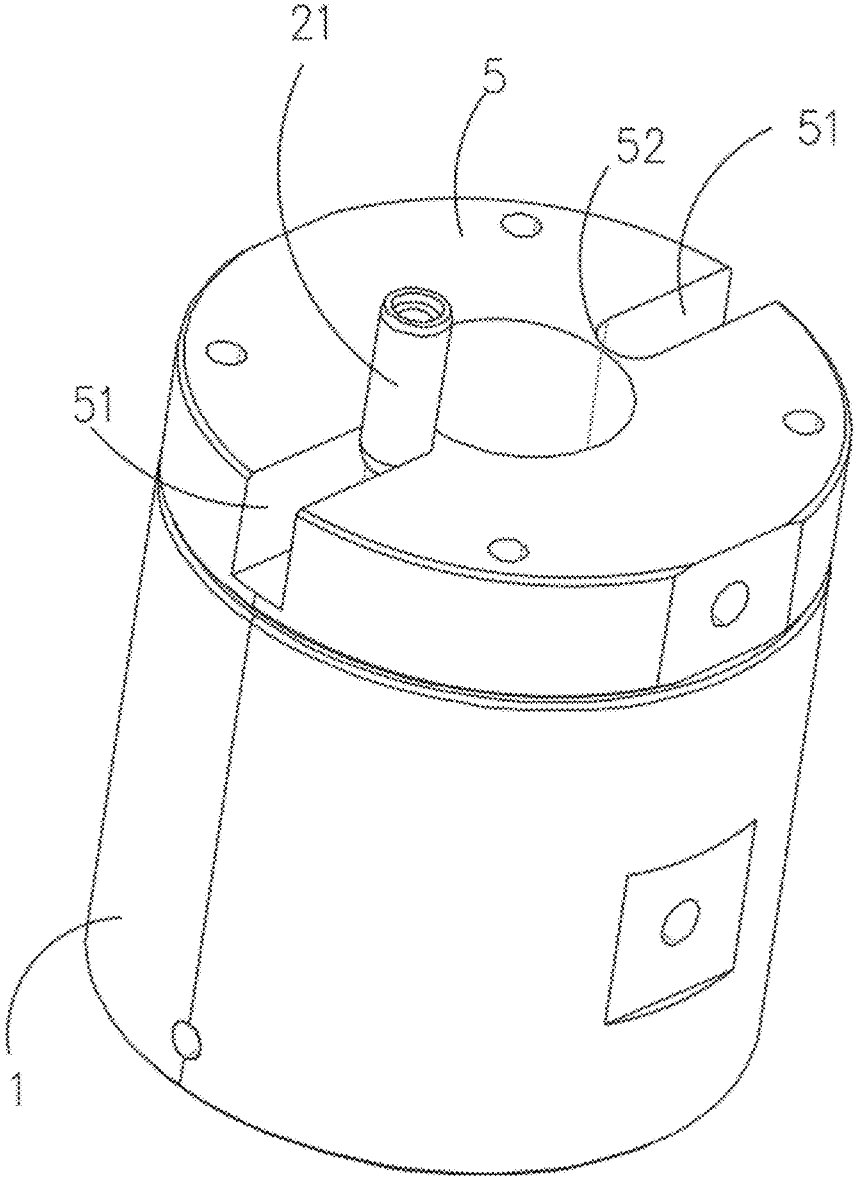
FIG. 2 illustrates a schematic structure diagram of a fixed air supply seat combined with a centering sleeve in the disclosure.
Figure 3:
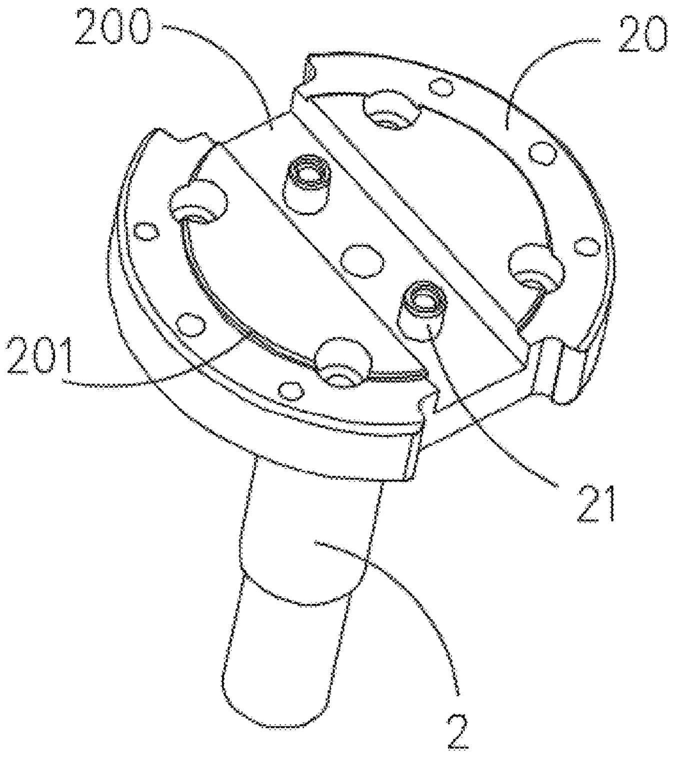
FIG. 3 illustrates a schematic structure diagram of a rotating shaft of the disclosure.
Figure 4:
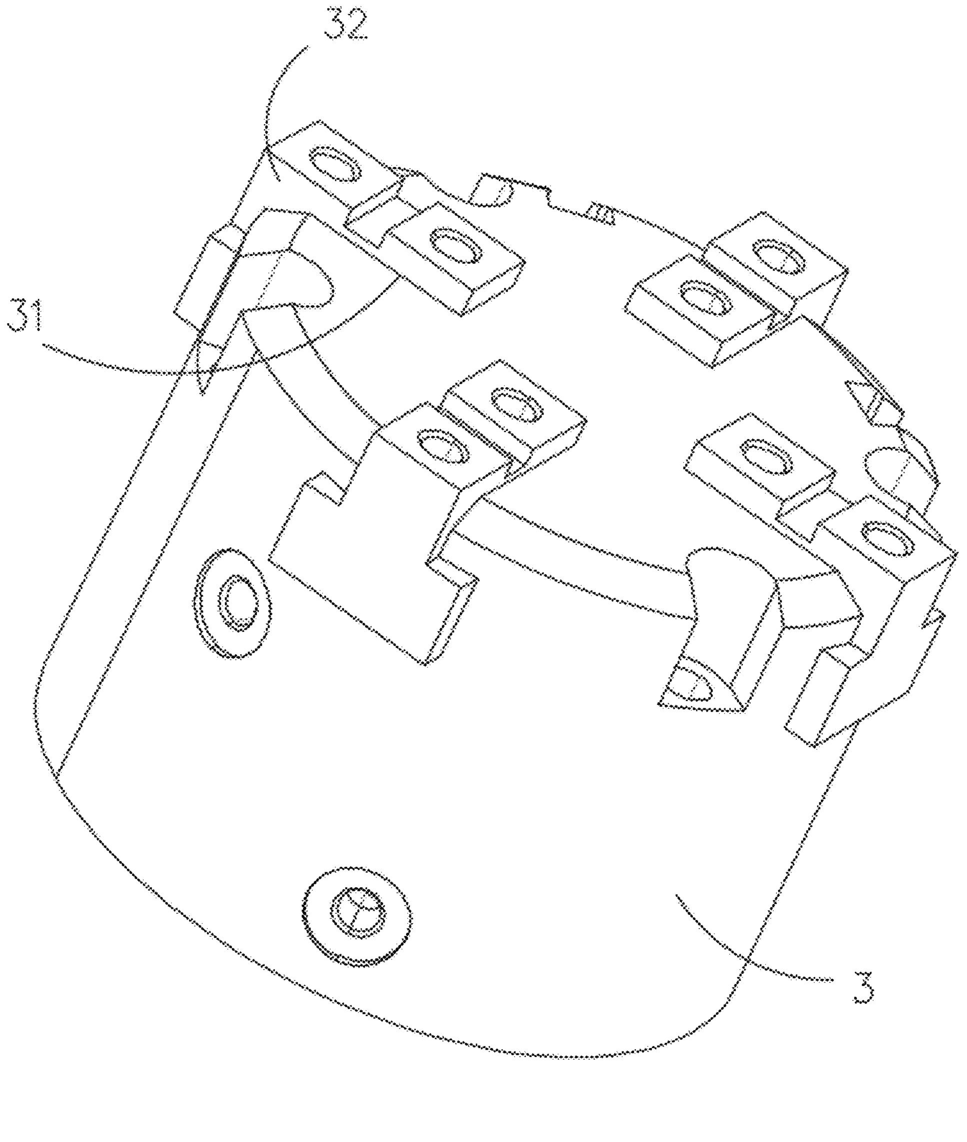
FIG. 4 illustrates a schematic structure diagram of a flanging positioning seat in the disclosure.
Figure 5:
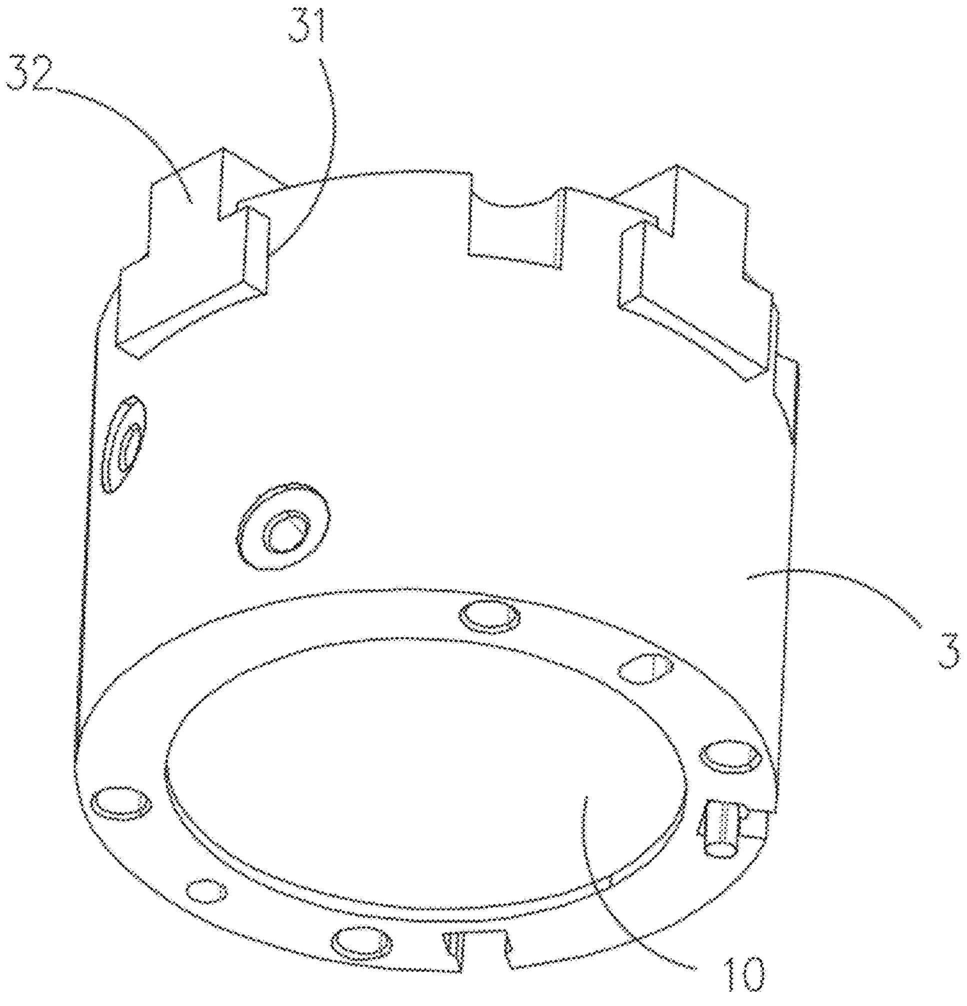
FIG. 5 illustrates another schematic structure diagram of the flanging positioning seat in the disclosure.
Figure 6:
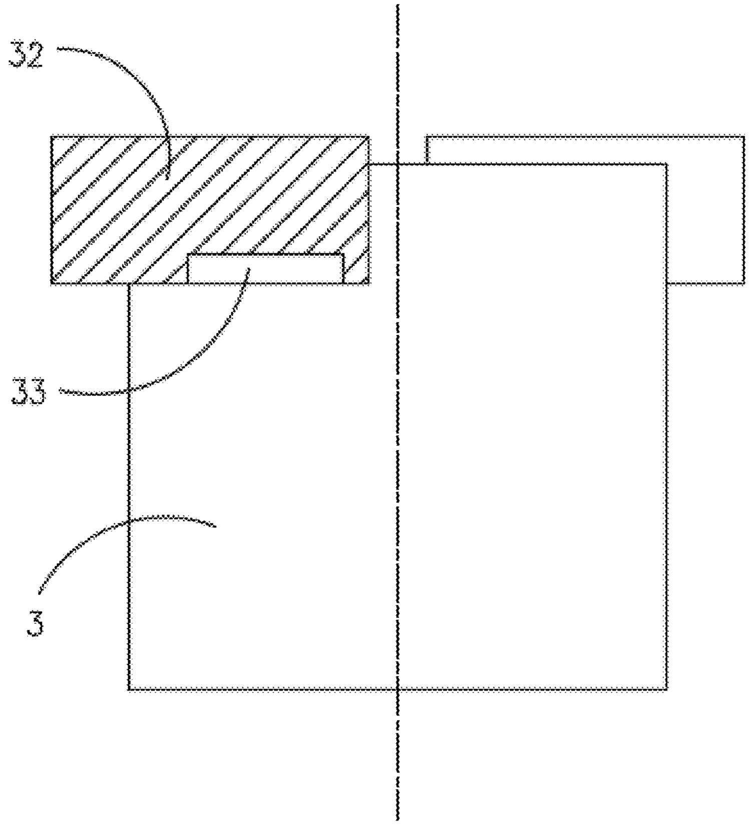
FIG. 6 illustrates a partial sectional structural diagram of the flanging positioning seat in the disclosure.
Figure 11:
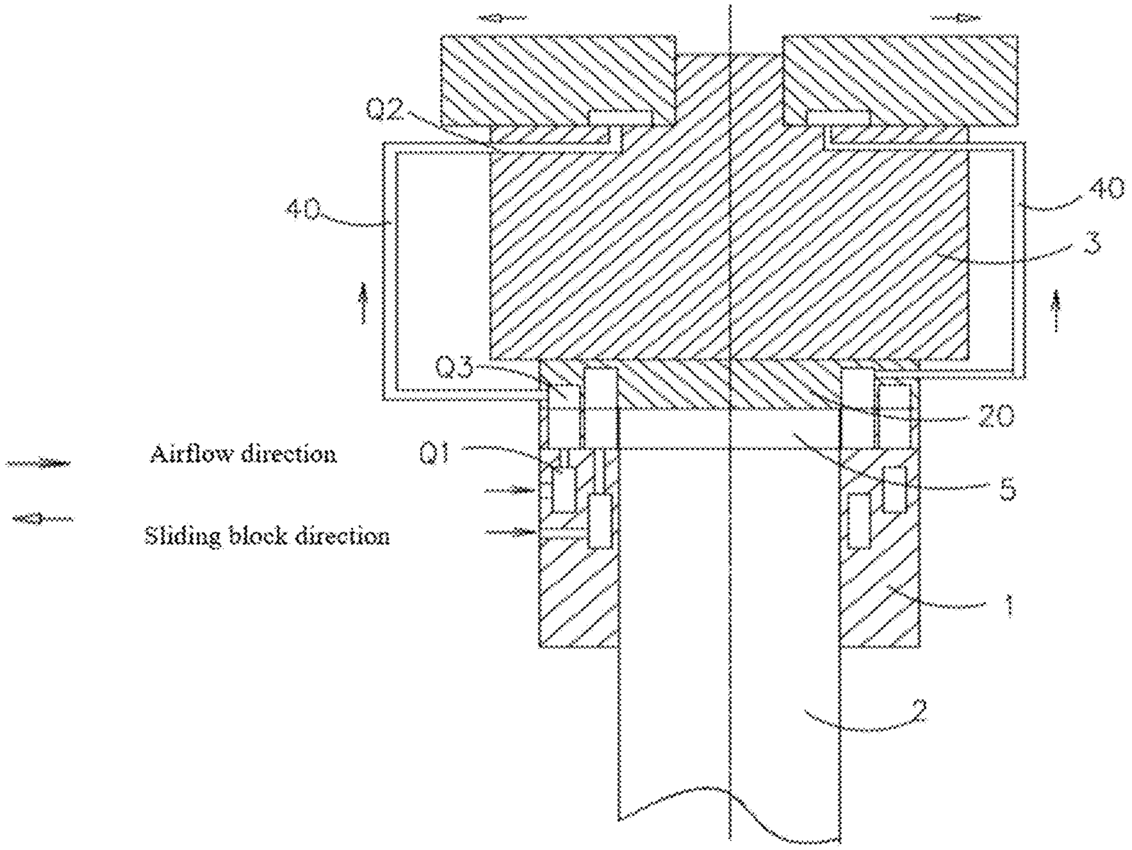
FIG. 11 illustrates a simplified schematic structure diagram of a pneumatic driving mechanism in the disclosure.
Figure 12:
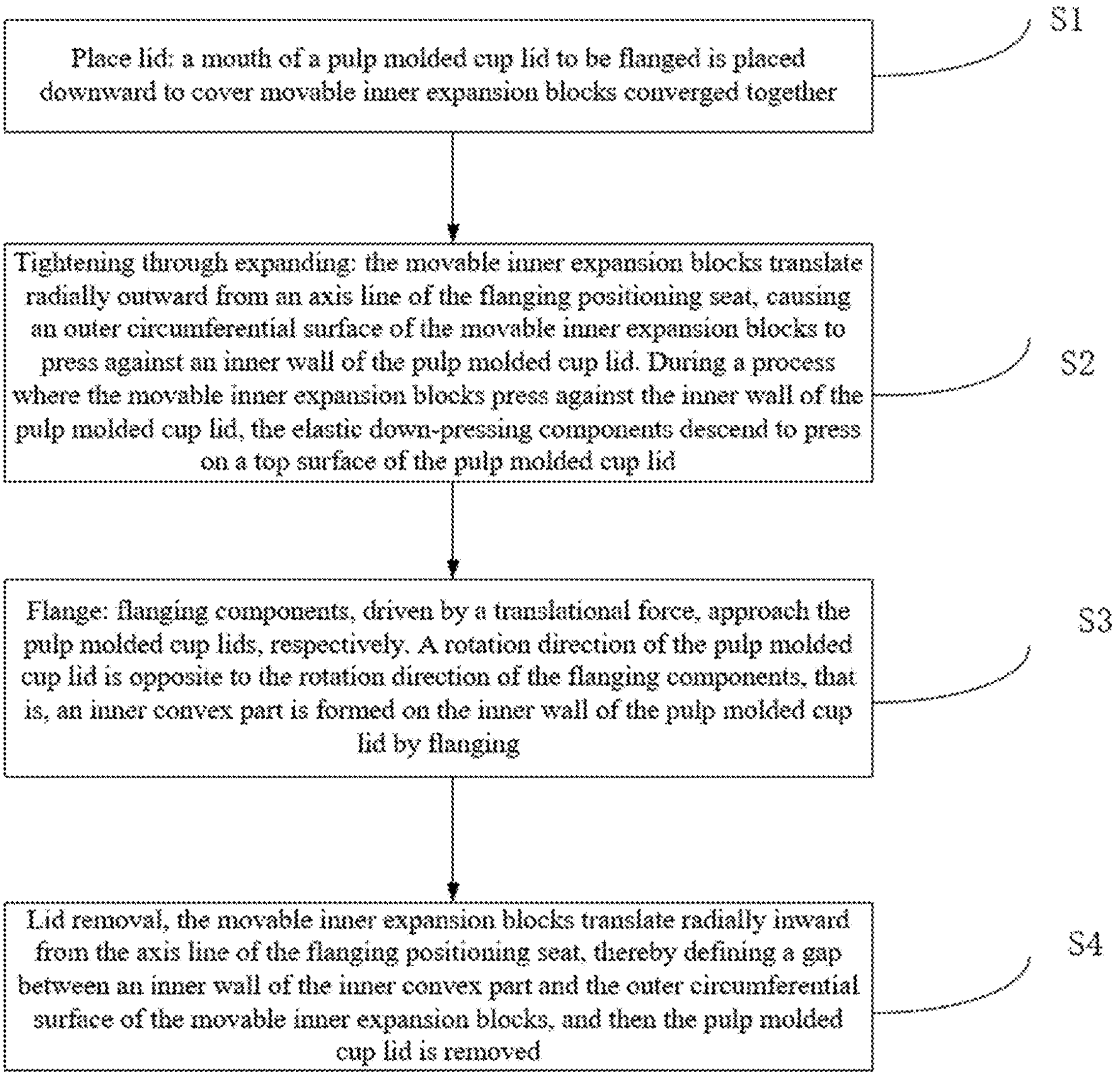
FIG. 12 illustrates a flowchart of a flanging method in the disclosure.

As shown in FIGS. 1 and 11, a telescopic flanging inner expansion assembly for a pulp molded cup lid includes a fixed air supply seat 1, a rotating shaft 2, a flanging positioning seat 3, movable inner expansion blocks 4, and a pneumatic driving mechanism. An outer contour of the movable inner expansion blocks 4 imitate an inner wall shape of the pulp molded cup lid. An outer circumferential surface of the movable inner expansion blocks 4 defines an inner concave forming groove, which is used for a formation of an inner convex part of the pulp molded cup lid. The fixed air supply seat 1 is in a cylindrical shape to facilitate the penetration of the rotating shaft 2. The rotating shaft 2 configured to be in an upright state, the rotating shaft 2 penetrates through the fixed air supply seat 1 and is rotatable relative to the fixed air supply seat 1. A slight gap is defined between the rotating shaft 2 and the fixed air supply seat 1 to allow for cooperation, enabling the rotating shaft 2 to rotate freely. An upper end of the rotating shaft 2 extends above an upper end of the fixed air supply seat 1, and a lower end of the rotating shaft 2 extends below a lower end of the fixed air supply seat 1. The flanging positioning seat 3 is mounted at a top of the rotating shaft 2, and the flanging positioning seat 3 rotates with the rotating shaft 2, which facilitates a flanging process. The movable inner expansion blocks 4 are circumferentially and evenly distributed around an axis line of the flanging positioning seat 3, and the movable inner expansion blocks 4 are configured to translate in a plane perpendicular to the axis line of the flanging positioning seat 3. The movable inner expansion blocks 4 converge towards the axis line of the flanging positioning seat 3 and encircle the flanging positioning seat 3 to form a ring can be covered by the pulp molded cup lid, and the movable inner expansion blocks 4 move outward to function as an inner expansion against an inner wall of the pulp molded cup lid.

The pneumatic driving mechanism includes at least one first air passage Q1 formed in the fixed air supply seat 1, and at least one second air passage Q2 formed in the flanging positioning seat 3, each of the at least one first air passage Q1 is communication with one of the at least one second air passage Q2, and configured to supply air to drive the movable inner expansion blocks 4 to translate in the plane perpendicular to the axis line of the flanging positioning seat 3.

In the embodiment, a telescopic internal expansion structure is used, when the movable inner expansion blocks 4 converge, the pulp molded cup lid is directly placed to cover the converged movable inner expansion blocks 4. Then, the converged movable inner expansion blocks 4 radially expand outward and internally expand against the inner wall of the pulp molded cup lid. After the flanging process is completed, the movable inner expansion blocks 4 converge radially inward. At this point, the outer circumferential surface of the movable inner expansion blocks 4 and the inner wall of the processed pulp molded cup lid form a gap that is greater than or equal to an inner diameter of the inner convex part. This allows the flanged pulp molded cup lid to be quickly removed without causing radial expansion of the inner diameter of the inner convex part during the removal process, ultimately ensuring a sealing performance of the pulp molded cup lid when placed on a cup and further enhancing the anti-detach performance.

In addition, the above method can also improve the flanging process qualification rate of the pulp molded cup lid and significantly reduce a scrap rate.

More specifically, the inner expansion method can ensure that a height of the inner convex part of the pulp molded cup lid is uniformly consistent after the flanging process. In contrast, the method in the background technology, due to the gap cooperation between the pulp molded cup lid and a lower mold, and a flanging pressure of a roller being a radial force on the pulp molded cup lid in a circumferential direction, a low structural strength of the pulp molded cup lid itself can lead to inconsistent heights of the inner convex part during the flanging process, which is detrimental to the sealing performance.

As shown in FIG. 11, a number of the movable inner expansion blocks is in a range of 2 to 4. In a specific embodiment, the number of the movable inner expansion blocks 4 is four, a number of the first air passage Q1 is two, and a number of the second air passage Q2 is two. Each of the two second air passage Q2 is configured to supply air to drive two of the four movable inner expansion blocks 4 to translate in the plane perpendicular to the axis line of the flanging positioning seat 3.

In addition, as shown in FIGS. 1-6 and 11, a centering sleeve 5 is disposed on a top of the fixed air supply seat 1, and the centering sleeve 5 rotatably abuts against the fixed air supply seat 1. The centering sleeve 5 is formed with a third air passage Q3 connected to the first air passage Q1, and a third air nozzle 50 connected to the third air passage Q3 is disposed on an outer circumferential surface of the centering sleeve 5, a second air nozzle 30 connected to the second air passage Q2 is disposed on an outer circumferential surface of the flanging positioning seat 3, and the third air nozzle 50 and the second air nozzle 30 are connected through a ventilation duct 40.

Specifically, a flange 20 is mounted on the top of the rotating shaft 2, the flanging positioning seat 3 is fixedly mounted on an upper surface of the flange 20, and the centering sleeve 5 is fixedly mounted on a lower surface of the flange 20. cylindrical locating pins 21 are disposed on the flange 20 and penetrating through the flange 20. The centering sleeve 5 defines radial slots 51 in a cross-section thereof, inner walls of the respective radial slots 51 are arc-shaped slot surfaces 52, the cylindrical locating pins 21 are inserted into the radial slots 51, respectively. A part of a cylindrical surface of each of the cylindrical locating pins 21 fits with a corresponding one of the arc-shaped slot surfaces 52. An outer side of each radial slot 51 is connected to an outside.

The radial slots 51 on the centering sleeve 5 cooperate with the cylindrical locating pins 21, ensuring that the axis line of the centering sleeve 5 coincides with the axis line of the rotating shaft 2. This alignment ensures that the third air passage Q3 within the centering sleeve 5 is concentrically connected with the first air passage Q1, guaranteeing a smooth operation of the airflow, as well as a stability and smoothness of rotation of the rotating shaft 2.

In addition, a flat-bottomed recess 10 is defined at a bottom of the flanging positioning seat 3, and the flange 20 includes an upper protrusion 201 matching the flat-bottomed recess 10. An upper surface of the flange 20 defines a through slot 200, upper ends of the cylindrical locating pins 21 are planes, and the upper ends of the cylindrical locating pins 21 extend out of the through slot 200 and abut against a bottom plane of the flat-bottomed recess 10.

As shown in FIGS. 1-6 and 11, the flanging positioning seat 3 defines radial sliding slots 31 on a top thereof, and a sliding block 32 is disposed on a lower surface of each of the movable inner expansion blocks 4, the sliding block 32 is movably mounted in a corresponding one of the radial sliding slots 31, and a sealed air chamber 33 is defined between a lower surface of each of the sliding blocks 32 and a bottom of the corresponding one of the radial sliding slots 31, and each of the at least one second air passage Q2 is at least connected to one the sealed air chamber 33. The movable inner expansion blocks 4 are either sector-shaped blocks or semi-circular blocks, with their shape depending on the total number of the movable inner expansion blocks. When there are four movable inner expansion blocks 4, the second air passage Q2 is provided with two second air passages Q2, both of which are annular construction and do not communicate with each other. Each second air passage Q2 is connected to two of the four sealed air chambers 33. When external air pressure enters the sealed air chambers 33, the movable inner expansion blocks 4 move radially outwards because of the air pressure. To achieve retraction, a retraction spring (not shown in the attached drawings) can be designed at the outer end or both side edges of the movable inner expansion blocks 4 to facilitate the retraction.

The first air passage Q1 is annular structure and is located on the top surface of the fixed air supply seat 1. The number of first air passages Q1 is set according to the number of movable inner expansion blocks 4. Taking the above example of the four movable inner expansion blocks 4, the first air passage Q1 is designed as two first air passages Q1 distributed inward and outward, each distinct from the other. Each first air passage Q1 is connected to a first air nozzle 11. The two third air passages Q3 located inside the centering sleeve 5 are structured as a larger and a smaller annular ring. Each of the two third air passage Q3 is connected to one of two first air passages Q1. Regarding the connection method, a lower wall of the centering sleeve 5 defines several radially distributed and axially aligned through holes thereon. The through holes are arranged in two concentric circles, with each concentric circle containing several through holes. Each of the two third air passage Q3 is connected to one of two first air passages Q1 through one of the concentric circles of through holes.

The lower end of the centering sleeve 5 is sealed to the upper end of the fixed air supply seat 1. The sealing connection can be a hard seal, a soft seal, or a combination of both. The soft seal is achieved using a sealing ring.

Embodiment 2

Figure 7:
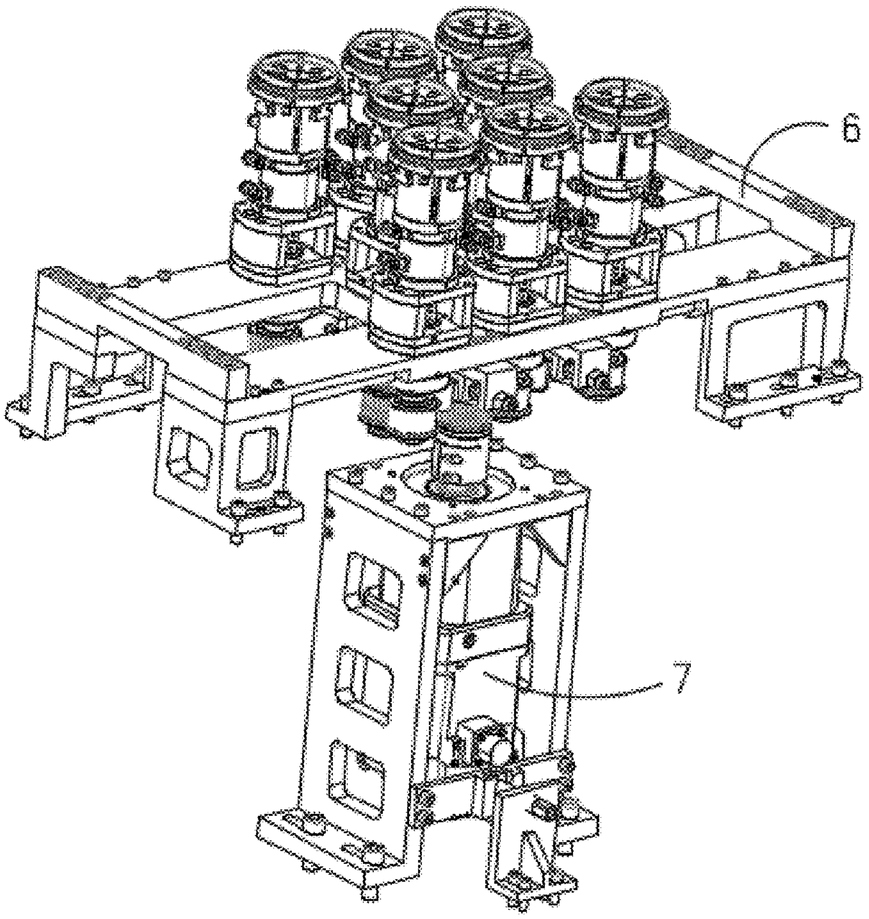
FIG. 7 illustrates a schematic structure diagram of eight stations provided with telescopic flanging inner expansion assembles in the disclosure.
Figure 8:
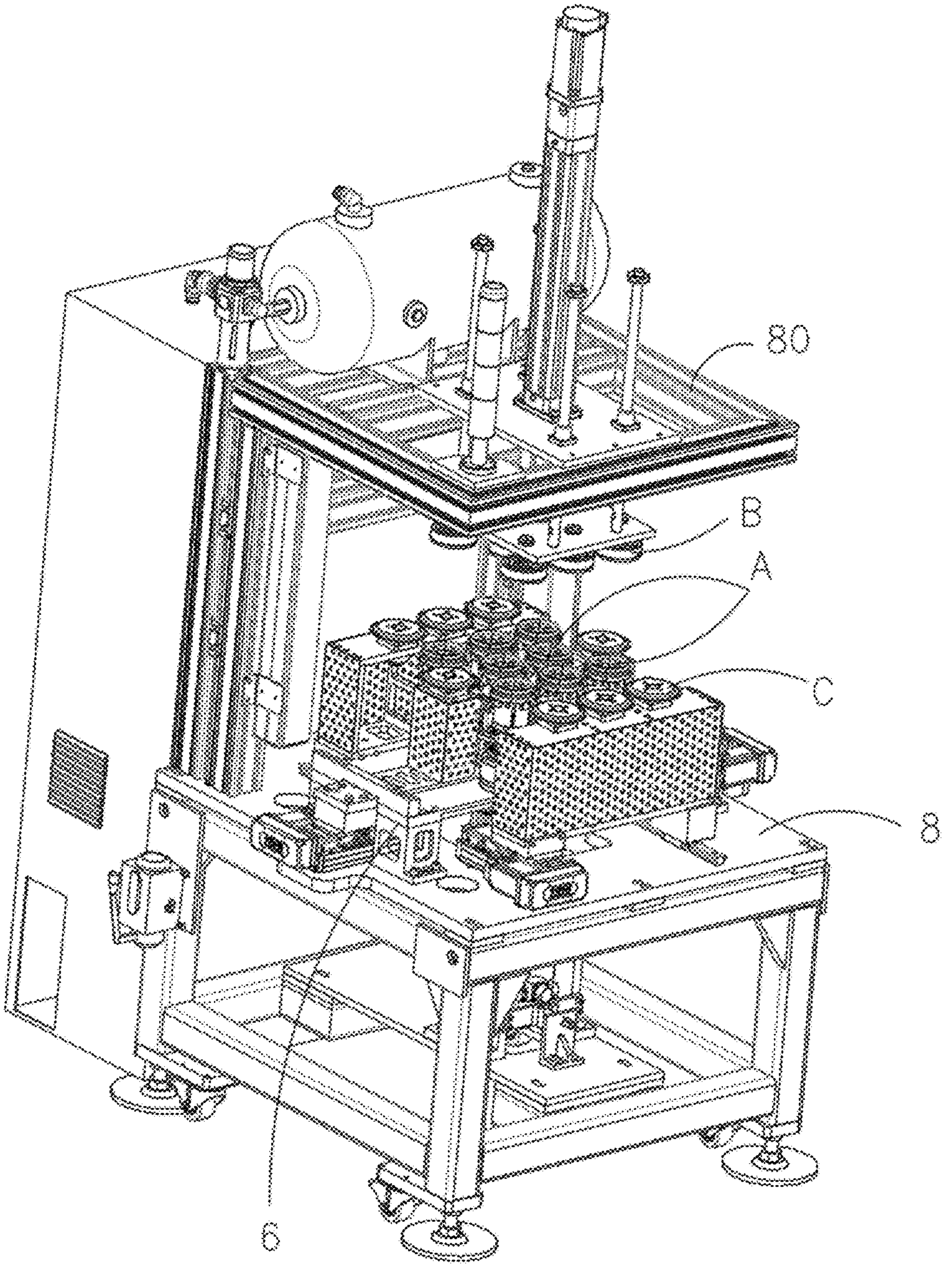
FIG. 8 illustrates a schematic structure diagram in an embodiment of the disclosure.
Figure 9:
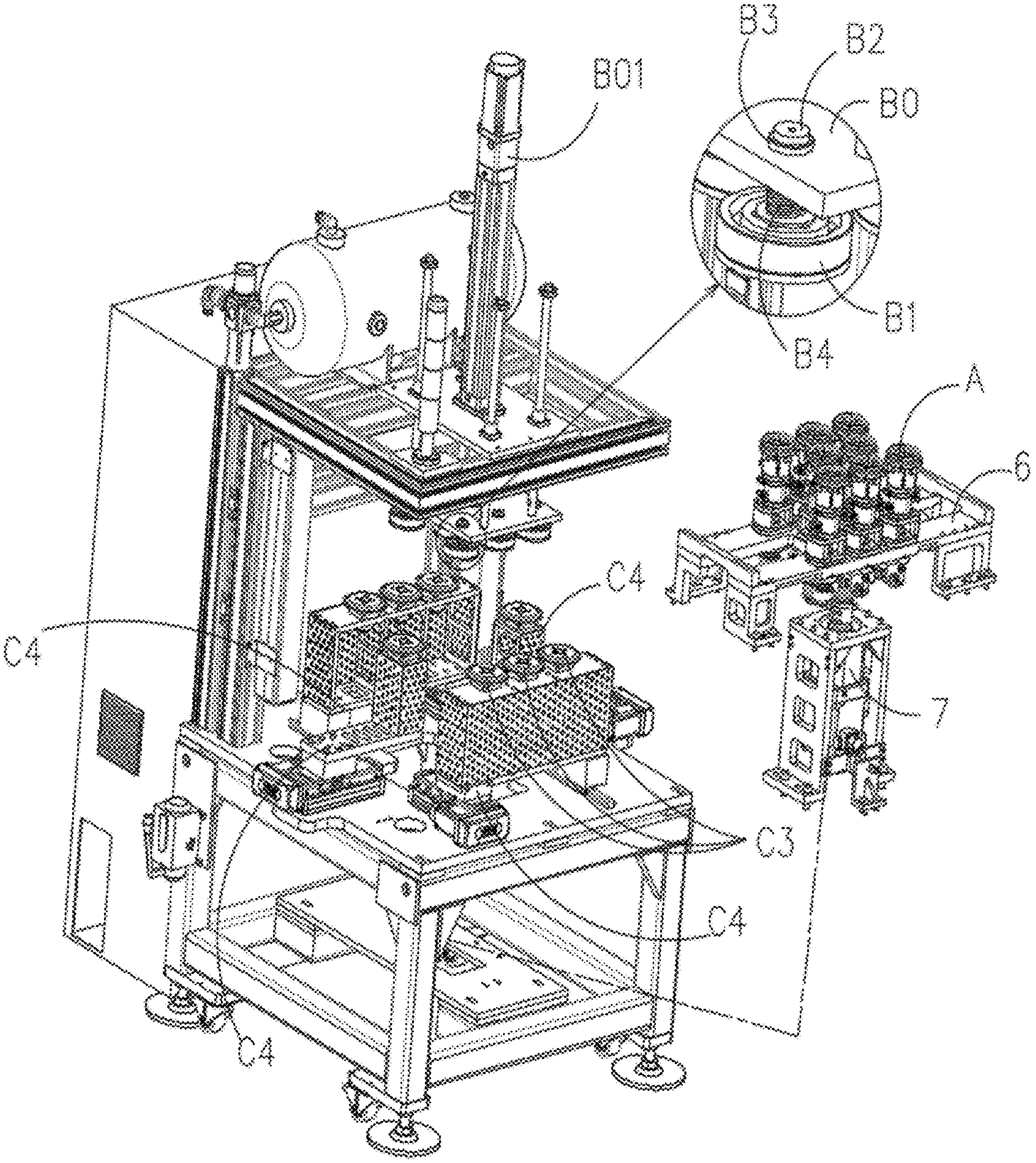
FIG. 9 illustrates a schematic diagram of a partial explosion structure illustrated in FIG. 8 in the disclosure.

As shown in FIGS. 7 to 9, a flanging device with multi stations for pulp molded cup lids includes a fixed frame 6, the multiple telescopic flanging inner expansion assemblies A in the embodiment 1 are rotatably disposed on the fixed frame 6.

The fixed frame 6 is fixedly mounted on a main body 8.

To ensure that the flanging does not jump, the flanging device of the embodiment also includes elastic down-pressing components B disposed above the multiple telescopic flanging inner expansion assemblies A, respectively, and also includes flanging components C disposed on lateral sides of the telescopic flanging inner expansion assemblies A, respectively.

A number of the elastic down-pressing components B and a number of the flanging components C are set based on a number of the telescopic flanging inner expansion assemblies A.

In the embodiment, the numbers of the telescopic flanging inner expansion assemblies A, the elastic down-pressing components B, and the flanging components C are eight. The eight telescopic flanging inner expansion assemblies A are configured to rotate synchronously in a same direction. This synchronous and co-directional rotation is achieved by engaging a single timing belt at lower ends of the rotating shafts 2, with the timing belt driven by a servo motor 7.

The eight elastic down-pressing components B are mounted on a lifting frame B0, the lifting frame B0 is connected to a lifting driver B01. The lifting driver B01 can be any one of a cylinder, a hydraulic cylinder, or a linear motor.

As shown in FIGS. 7 to 9, each elastic pressing component B includes a pressing block B1, a lower surface of the pressing block B1 is provided with a flexible sheet. The flexible sheet can be made of materials such as sponge or silicone, etc. A center of an upper surface of the pressing block B1 is provided with a connecting shaft B2. An upper end of the connecting shaft B2 penetrates through a shaft hole defined on the lifting frame B0. A detach prevention cap B3 is mounted on the upper end of the connecting shaft B2, and the detach prevention cap B3 is secured against the upper surface of the lifting frame B0. A spring B4 is sleeved on the connecting shaft B2, a lower end of the spring B4 acts on the upper surface of the pressing block B1 and the upper end of the spring B4 acts on a lower surface of the lifting frame B0.

The lifting driver B01 is mounted on a cantilever rack 80 of the main body 8, and the flanging components C are mounted on the main body 8, that is, the main body 8 includes a platform, and both the flanging components C and the fixed frame 6 are respectively mounted on the platform.

In order to make a layout more rational, in the embodiment, the eight telescopic flanging inner expansion assemblies A are arranged in three rows, a number of the telescopic flanging inner expansion assemblies A in a central row of the three rows is less than a number of the telescopic flanging inner expansion assemblies A in each of rest two rows of the three rows, and the numbers of the telescopic flanging inner expansion assemblies A in the respective rest two rows are equal. That is, there are two telescopic flanging inner expansion assemblies A in the central row and three telescopic flanging inner expansion assemblies A in each of the rest two rows.

A number of the flanging components C is eight, the eight flanging components C are arranged in three rows, two of the eight flanging components C in a central row of the three rows and the telescopic flanging inner expansion assemblies A in the central row are arranged on a straight line, and the flanging components C in each of rest two rows of the three rows are positioned on outer sides of the respective telescopic flanging inner expansion assemblies A in a corresponding one of the rest two rows.

The two flanging components C in the central row are movable towards each other or away from each other, the flanging components C of one of the rest two rows and the flanging components C of the other one of the rest two rows are movable towards each other or away from each other.

Each of the flanging components C includes a translation seat C4 and a flanging wheel C3 mounted on the translation seat C4, and the translation seat C4 is driven by a linear drive component.

As shown in FIGS. 7 to 9, and 12, a flanging method for pulp molded cup lids includes steps as follows.

- S1, Place lid: a mouth of a pulp molded cup lid to be flanged is placed downward to cover movable inner expansion blocks 4 converged together.
- S2, Tightening through expanding: the movable inner expansion blocks 4 translate radially outward from an axis line of the flanging positioning seat 3, causing an outer circumferential surface of the movable inner expansion blocks 4 to press against an inner wall of the pulp molded cup lid. During a process where the movable inner expansion blocks 4 press against the inner wall of the pulp molded cup lid, the elastic down-pressing components B descend to press on a top surface of the pulp molded cup lid.
- S3, Flange: flanging components C, driven by a translational force, approach the pulp molded cup lids, respectively. A rotation direction of the pulp molded cup lid (i.e., a rotation direction of the rotation shaft 2) is opposite to the rotation direction of the flanging components C (i.e., a rotation direction of flanging wheel C3), that is, an inner convex part is formed on the inner wall of the pulp molded cup lid by flanging.
- S4, Lid removal, the movable inner expansion blocks 4 translate radially inward from the axis line of the flanging positioning seat 3, thereby defining a gap between an inner wall of the inner convex part and the outer circumferential surface of the movable inner expansion blocks 4, and then the pulp molded cup lid is removed.

Figure 10:
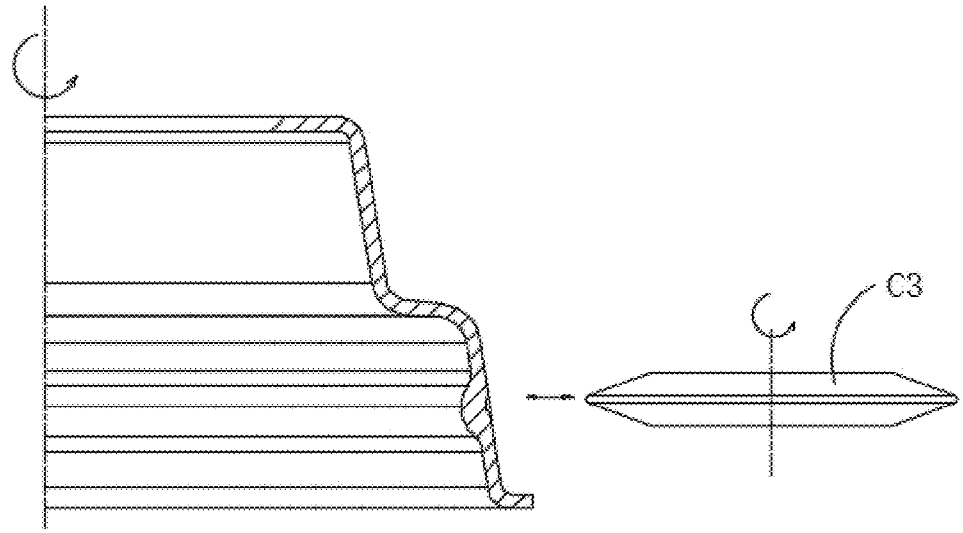
FIG. 10 illustrates a schematic structure diagram of a pulp molded cup lid after flanging in the disclosure.

The pulp molded cup lid after the flanging is shown in FIG. 10.

The specific embodiments described in the specification are merely illustrative of the spirit of the disclosure. Those skilled in the art to which the disclosure belongs may make various modifications or supplements to the specific embodiments described, or adopt similar methods to replace them, without departing from the spirit of the disclosure or exceeding the scope defined in the appended claims.

What is claimed is:

1. A telescopic flanging inner expansion assembly for a pulp molded cup lid, comprising:

- a fixed air supply seat (1);
- a rotating shaft (2), wherein the rotating shaft (2) is configured to be in an upright state, the rotating shaft (2) penetrates through the fixed air supply seat (1) and is rotatable relative to the fixed air supply seat (1);
- a flanging positioning seat (3), wherein the flanging positioning seat (3) is mounted at a top of the rotating shaft (2);
- movable inner expansion blocks (4), wherein the movable inner expansion blocks (4) are circumferentially and evenly distributed around an axis line of the flanging positioning seat (3), and the movable inner expansion blocks (4) are configured to translate in a plane perpendicular to the axis line of the flanging positioning seat (3);
- a pneumatic driving mechanism, wherein the pneumatic driving mechanism comprises at least one first air passage (Q1) formed in the fixed air supply seat (1), and at least one second air passage (Q2) formed in the flanging positioning seat (3), each of the at least one first air passage (Q1) is communication with one of the at least one second air passage (Q2), and configured to supply air to drive the movable inner expansion blocks (4) to translate in the plane perpendicular to the axis line of the flanging positioning seat (3).

2. The telescopic flanging inner expansion assembly as claimed in claim 1, wherein a number of the movable inner expansion blocks (4) is four, a number of the at least one first air passage (Q1) is two, and a number of the at least one second air passage (Q2) is two; each of the two second air passage (Q2) is configured to supply air to drive corresponding two of the four movable inner expansion blocks (4) to translate in the plane perpendicular to the axis line of the flanging positioning seat (3).

3. The telescopic flanging inner expansion assembly as claimed in claim 1, wherein a centering sleeve (5) is disposed on a top of the fixed air supply seat (1), and the centering sleeve (5) rotatably abuts against the fixed air supply seat (1); the centering sleeve (5) is formed with at least one third air passage (Q3) connected to the at least one first air passage (Q1), and at least one third air nozzle (50) connected to the at least one third air passage (Q3) is disposed on an outer circumferential surface of the centering sleeve (5), at least one second air nozzle (30) connected to the at least one second air passage (Q2) is disposed on an outer circumferential surface of the flanging positioning seat (3), and each of the at least one third air nozzle (50) and one of the at least one second air nozzle (30) are connected through a ventilation duct (40).

4. The telescopic flanging inner expansion assembly as claimed in claim 3, wherein a flange (20) is mounted on the top of the rotating shaft (2), the flanging positioning seat (3) is fixedly mounted on an upper surface of the flange (20), and the centering sleeve (5) is fixedly mounted on a lower surface of the flange (20).

5. The telescopic flanging inner expansion assembly as claimed in claim 4, wherein cylindrical locating pins (21) are disposed on the flange (20) and penetrating through the flange (20); the centering sleeve (5) defines radial slots (51) in a cross-section thereof, inner walls of the respective radial slots (51) are arc-shaped slot surfaces (52), the cylindrical locating pins (21) are inserted into the radial slots (51), respectively; and a part of a cylindrical surface of each of the cylindrical locating pins (21) fits with a corresponding one of the arc-shaped slot surfaces (52).

6. The telescopic flanging inner expansion assembly as claimed in claim 1, wherein the flanging positioning seat (3) defines radial sliding slots (31) on a top thereof, and a sliding block (32) is disposed on a lower surface of each of the movable inner expansion blocks (4), the sliding block (32) is movably mounted in a corresponding one of the radial sliding slots (31), and a sealed air chamber (33) is defined between a lower surface of each of the sliding blocks (32) and a bottom of the corresponding one of the radial sliding slots (31), and each of the at least one second air passage (Q2) is at least connected to one the sealed air chamber (33).

7. A flanging device with multi stations for pulp molded cup lids, comprising: a fixed frame (6), wherein a plurality of the telescopic flanging inner expansion assemblies (A) as claimed in claim 1 are rotatably disposed on the fixed frame (6).

8. The flanging device with the multi stations as claimed in claim 7, wherein the flanging device further comprises:

elastic down-pressing components (B) disposed above the plurality of the telescopic flanging inner expansion assemblies (A), respectively; and flanging components (C) disposed on lateral sides of the telescopic flanging inner expansion assemblies (A), respectively.

9. The flanging device with the multi stations as claimed in claim 8, wherein a number of the telescopic flanging inner expansion assemblies (A) is eight, and the eight telescopic flanging inner expansion assemblies (A) are configured to rotate synchronously in a same direction; a number of the elastic down-pressing components (B) is eight, the eight elastic down-pressing components (B) are disposed on a lifting frame (C1), and the lifting frame (C1) is connected to a lifting driver (C2).

10. The flanging device with the multi stations as claimed in claim 9, wherein the eight telescopic flanging inner expansion assemblies (A) are arranged in three rows, a number of the telescopic flanging inner expansion assemblies (A) in a central row of the three rows is less than a number of the telescopic flanging inner expansion assemblies (A) in each of rest two rows of the three rows, and the numbers of the telescopic flanging inner expansion assemblies (A) in the respective rest two rows are equal;

wherein a number of the flanging components (C) is eight, the eight flanging components (C) are arranged in three rows, two of the eight flanging components (C) in a central row of the three rows and the telescopic flanging inner expansion assemblies (A) in the central row are arranged on a straight line, and the flanging components (C) in each of rest two rows of the three rows are positioned on outer sides of the respective telescopic flanging inner expansion assemblies (A) in a corresponding one of the rest two rows.

11. The flanging device with the multi stations as claimed in claim 10, wherein the two flanging components (C) in the central row are movable towards each other or away from each other, the flanging components (C) of one of the rest two rows and the flanging components (C) of the other one of the rest two rows are movable towards each other or away from each other.

12. The flanging device with the multi stations as claimed in claim 10, wherein each of the flanging components (C) comprises a translation seat (C4) and a flanging wheel (C3) mounted on the translation seat (C4).

* * * * *